United States Patent
Watkins

(10) Patent No.: US 7,325,065 B1
(45) Date of Patent: Jan. 29, 2008

(54) IDENTIFYING UNAUTHORIZED COMMUNICATION SYSTEMS USING A SYSTEM-SPECIFIC IDENTIFIER

(75) Inventor: Robert G. Watkins, Vienna, VA (US)

(73) Assignee: AOL LLC, a Delaware Limited Liability Company, Dulles, VA (US)

(*) Notice: Subject to any disclaimer, the term of this patent is extended or adjusted under 35 U.S.C. 154(b) by 660 days.

(21) Appl. No.: 10/058,338

(22) Filed: Jan. 30, 2002

Related U.S. Application Data

(60) Provisional application No. 60/341,814, filed on Dec. 21, 2001.

(51) Int. Cl.
*G06F 15/16* (2006.01)

(52) U.S. Cl. ............... 709/229; 709/224; 717/177

(58) Field of Classification Search ........ 713/202, 713/182, 185, 168, 155, 184, 161, 201, 183, 713/172, 170, 171; 434/322; 380/262, 30, 380/29, 259; 705/69, 7, 52, 26, 54; 707/203; 358/403; 709/223, 229, 224, 227, 230; 370/230; 726/20, 23, 14, 4; 717/177
See application file for complete search history.

(56) References Cited

U.S. PATENT DOCUMENTS

| | | | | |
|---|---|---|---|---|
| 4,964,163 A | * | 10/1990 | Berry | 713/183 |
| 5,091,939 A | * | 2/1992 | Cole et al. | 713/183 |
| 5,365,580 A | * | 11/1994 | Morisaki | 379/189 |
| 5,375,169 A | * | 12/1994 | Seheidt et al. | 713/171 |
| 5,402,492 A | * | 3/1995 | Goodman et al. | 726/20 |
| 5,416,840 A | * | 5/1995 | Cane et al. | 705/52 |
| 5,491,752 A | * | 2/1996 | Kaufman et al. | 380/30 |
| 5,506,905 A | * | 4/1996 | Markowski et al. | 380/262 |
| 5,515,426 A | * | 5/1996 | Yacenda et al. | 379/201.07 |
| 5,579,126 A | * | 11/1996 | Otsuka | 358/403 |
| 5,584,022 A | * | 12/1996 | Kikuchi et al. | 707/9 |
| 5,606,609 A | | 2/1997 | Houser et al. | |
| 5,638,448 A | * | 6/1997 | Nguyen | 380/29 |
| 5,666,415 A | * | 9/1997 | Kaufman | 713/159 |
| 5,715,390 A | * | 2/1998 | Hoffman et al. | 726/20 |
| 5,719,941 A | * | 2/1998 | Swift et al. | 713/155 |
| 5,737,421 A | * | 4/1998 | Audebert | 713/170 |
| 5,751,812 A | * | 5/1998 | Anderson | 713/155 |
| 5,784,565 A | * | 7/1998 | Lewine | 709/229 |
| 5,802,176 A | * | 9/1998 | Audebert | 713/184 |

(Continued)

FOREIGN PATENT DOCUMENTS

WO    WO 99/66422    12/1999

OTHER PUBLICATIONS

RFC 2759. The Change Password (version 1) and Change Password (version 2) packets www.tzi.de/~cabo/pdfrfc/rfc2759.txt.pdf.*

(Continued)

*Primary Examiner*—Thong Vu
(74) *Attorney, Agent, or Firm*—Fish & Richardson P.C.

(57) ABSTRACT

An authorized client communication system seeking access to a host communication system may be identified by performing a mathematical computation on a client communication system-specific identifier and an access password. Communications from the client communication system are terminated if the result of the mathematical computation does not correspond to an authorized client communication system. Another aspect involves storing information about an authorized client communication system.

73 Claims, 8 Drawing Sheets

U.S. PATENT DOCUMENTS

| | | | | |
|---|---|---|---|---|
| 5,805,816 | A * | 9/1998 | Picazo et al. | 709/223 |
| 5,826,029 | A * | 10/1998 | Gore et al. | 709/227 |
| 5,841,871 | A * | 11/1998 | Pinkas | 713/155 |
| 5,857,021 | A * | 1/1999 | Kataoka et al. | 705/54 |
| 5,862,218 | A * | 1/1999 | Steinberg | 713/176 |
| 5,887,065 | A * | 3/1999 | Audebert | 713/172 |
| 5,892,828 | A * | 4/1999 | Perlman | 713/183 |
| 5,918,009 | A * | 6/1999 | Gehani et al. | 713/201 |
| 5,949,152 | A | 9/1999 | Tagawa et al. | |
| 5,956,633 | A * | 9/1999 | Janhila | 455/410 |
| 5,983,273 | A * | 11/1999 | White et al. | 709/229 |
| 6,005,943 | A * | 12/1999 | Cohen et al. | 380/30 |
| 6,044,471 | A | 3/2000 | Colvin | |
| 6,049,670 | A * | 4/2000 | Okada et al. | 717/177 |
| 6,072,876 | A * | 6/2000 | Obata et al. | 380/286 |
| 6,073,123 | A | 6/2000 | Staley | |
| 6,073,234 | A * | 6/2000 | Kigo et al. | 713/161 |
| 6,128,588 | A * | 10/2000 | Chacon | 703/6 |
| 6,134,593 | A * | 10/2000 | Alexander et al. | 709/229 |
| 6,134,659 | A | 10/2000 | Sprong et al. | |
| 6,141,759 | A * | 10/2000 | Braddy | 726/14 |
| 6,161,185 | A * | 12/2000 | Guthrie et al. | 713/201 |
| 6,202,158 | B1 * | 3/2001 | Urano et al. | 713/201 |
| 6,230,269 | B1 * | 5/2001 | Spies et al. | 713/182 |
| 6,236,975 | B1 * | 5/2001 | Boe et al. | 705/7 |
| 6,341,352 | B1 * | 1/2002 | Child et al. | 726/1 |
| 6,431,875 | B1 * | 8/2002 | Elliott et al. | 434/322 |
| 6,446,052 | B1 * | 9/2002 | Juels | 705/69 |
| 6,502,192 | B1 * | 12/2002 | Nguyen | 726/4 |
| 6,564,232 | B1 * | 5/2003 | Cole et al. | 707/203 |
| 6,615,353 | B1 * | 9/2003 | Hashiguchi | 713/185 |
| 6,657,956 | B1 * | 12/2003 | Sigaud | 370/230 |
| 6,665,800 | B1 * | 12/2003 | Jaber | 713/202 |
| 6,694,436 | B1 * | 2/2004 | Audebert | 726/9 |
| 6,738,810 | B1 * | 5/2004 | Kramer et al. | 709/224 |
| 6,742,129 | B1 * | 5/2004 | Higgs et al. | 713/202 |
| 6,801,946 | B1 * | 10/2004 | Child et al. | 709/230 |
| 6,807,451 | B2 * | 10/2004 | Shida et al. | 700/97 |
| 6,826,686 | B1 * | 11/2004 | Peyravian et al. | 713/168 |
| 6,829,712 | B1 * | 12/2004 | Madoukh | 726/2 |
| 6,834,112 | B1 * | 12/2004 | Brickell | 380/279 |
| 6,836,651 | B2 * | 12/2004 | Segal et al. | 455/405 |
| 6,871,276 | B1 * | 3/2005 | Simon | 713/156 |
| 6,883,095 | B2 * | 4/2005 | Sandhu et al. | 713/168 |
| 6,889,212 | B1 | 5/2005 | Wang et al. | |
| 6,904,526 | B1 * | 6/2005 | Hongwei | 713/182 |
| 6,910,135 | B1 * | 6/2005 | Grainger | 726/23 |
| 6,928,558 | B1 * | 8/2005 | Allahwerdi et al. | 713/172 |
| 6,954,861 | B2 * | 10/2005 | Watkins et al. | 726/28 |
| 7,062,655 | B2 * | 6/2006 | Nelson et al. | 713/183 |
| 2001/0044898 | A1 * | 11/2001 | Benussi et al. | 713/173 |
| 2002/0013737 | A1 * | 1/2002 | Arai | 705/26 |
| 2002/0059110 | A1 * | 5/2002 | Yamamoto et al. | 705/26 |
| 2002/0067832 | A1 * | 6/2002 | Jablon | 380/277 |
| 2002/0095487 | A1 * | 7/2002 | Day et al. | 709/223 |
| 2002/0143938 | A1 * | 10/2002 | Alexander et al. | 709/224 |
| 2002/0172363 | A1 * | 11/2002 | Dierks et al. | 380/259 |
| 2002/0184501 | A1 * | 12/2002 | Bin Abdul Rahman et al. | 713/173 |
| 2003/0041268 | A1 * | 2/2003 | Hashimoto | 713/201 |
| 2003/0046587 | A1 * | 3/2003 | Bheemarasetti et al. | 713/201 |
| 2003/0051083 | A1 * | 3/2003 | Striemer | 710/72 |

OTHER PUBLICATIONS

A Framework For An Adaptive Intrusion Detection System With . . . —Hossain, Bridges (2001) www.cs.msstate.edu/~bridges/papers/citss-2001.pdf.*

From Formal Security Specifications to Executable Assertions . . . —Cristina Serban (1995) www.cs.umr.edu/techreports/95-01.ps.*

A Dynamic Intrusion-Detection Methodology—Munson, Elbaum www.soft-metrics.com/docs/Theoretical.pdf.*

Detecting Anomalous and Unknown Intrusions Against Programs—Ghosh, Wanken, Charron (1998) ftp.rstcorp.com/pub/papers/acsac98.ps.*

Using SPKI Certificates for Authorization in CORBA based . . . —Lampinen (1999) www.tcm.hut.fi/Research/TeSSA/Papers/Lampinen/Lampinen-NordSec99.ps.*

Intrusion Detection Applying Machine Learning to Solaris Audit Data—Endler (1998) www.cs.umbc.edu/cadip/docs/NetworkIntrusion/endler98.ps.*

Krim, Jonathan, "Opening a New Windows Activation," *The Washington Post*, Sunday, Oct. 21, 2001, p. H7.

* cited by examiner

IDENTIFYING UNAUTHORIZED COMMUNICATION SYSTEMS USING A SYSTEM-SPECIFIC IDENTIFIER

This application claims priority from U.S. Provisional Application No. 60/341,814, titled "Local Password Protection" and filed Dec. 21, 2001, which is incorporated by reference in its entirety.

TECHNICAL FIELD

This invention relates to identifying unauthorized communication systems.

BACKGROUND

When computer systems communicate, at least one of those systems generally is configured with software enabling the communication. For instance, in a computer network configured for client-server communications, the client communication system is configured with client software that enables access to and interaction with the server system. Often, such client software stores a password that is used to identify a user as authorized. This password may be accessed and misused by an unauthorized user in an attack that may compromise the security of information and services available to the authorized user.

SUMMARY

In one general aspect, when an unauthorized client communication system seeks access to a host communication system, a mathematical computation may be performed on an access password and a client-communication-system-specific identifier. The client communication system may be designated as unauthorized based on a result of the mathematical computation.

Implementations may include one or more of the following features. For example, the computation may include a hashing algorithm. The access password used in the computation may include a user password, a subscriber password, or an account password. The client-communication-system-specific identifier used in the computation may be a device-specific identifier, such as a hard disk identifier, an Ethernet address, a central processing unit serial number, or storage characteristics of a hard disk. The client-communication-system-specific identifier may vary based on the client communication system. The computation may be performed when a communication is initiated.

The computation may be a host-based computation that accesses a result of a first computation performed on the access password and the client-communication-system-specific identifier, accesses the client-communication-system-specific identifier from the client communication system, and accesses the access password located on the host communication system. The result of the first computation may be accessed from the client communication system or from the host communication system. The host-based computation maybe performed on the stored version of the access password located on the host communication system and the client-communication-system-specific identifier accessed from the client communication system. The client communication system may be designated as unauthorized if the result of the first computation does not correspond to the result of the host-based mathematical computation.

Implementations may include sending a notification to the client communication system indicating the designation as an unauthorized client communication system, terminating communications from the client communication system, or terminating communications after a predetermined delay if the result of the first computation does not correspond to the result of the host-based computation.

In another general aspect, information about authorized client communication systems, including access passwords, is stored. In addition, a computation is performed on an access password and a client-communication-system-specific identifier, and the result of the computation is stored. The computation may be performed by, and the result stored on, the client communication system or the host communication system. The access password may be stored on the host communication system.

Implementations may include one or more of the features discussed above. For example, the client-communication-system-specific identifier may vary based on the client communication system.

Implementations of the techniques discussed above may include a method or process, an apparatus or system, or computer software on a computer-accessible medium.

The details of one or more of the implementations are set forth in the accompanying drawings and the description below. Other features and advantages will be apparent from the descriptions and drawings, and from the claims.

DESCRIPTION OF DRAWINGS

Like reference symbols in the various drawings indicate like elements.

DETAILED DESCRIPTION

A client communication system can be designated as authorized to access a secured host communication system based on a mathematical computation performed using at least a client-communication-system-specific identifier. The result of the computation may be stored at the client communication system or the host communication system. When access is requested to the host communication system, the stored result of the computation is accessed by the host communication system and the client-communication-system-specific identifier of the client communication system requesting access is retrieved by the host communication system. The host communication system then authenticates the system requesting access by performing a computation using the retrieved client-communication-system-specific identifier and comparing the results of that computation with the stored result that has been accessed.

The computations performed based on the client-communication-system-specific identifier generally also involve a user or system password. For example, the computations may be performed on a hash of the client-communications-system-specific identifier and the password. As such, the results of the computation may be stored at the client communication system as an alternative to storing the password at that system, making the password less vulnerable to access by unauthorized users. The host communication system uploads the stored result and accesses the identifier from a system seeking access. However, to authorize access by the requesting system, the host communication system also accesses a password stored at the host-level for the user seeking access using the requesting system. The host communication system then uses this password and the accessed identifier to perform a computation, the results of which the host communication system uses to verify the stored results uploaded from the requesting system so as to determine whether the system is authorized to access the host communication system.

In another similar example where the client-communication-system-specific identifier involves a user or system password, the results of the computation performed on the identifier and the password for a client communication system are stored at the host-level along with (although not necessarily proximate to) the password. As such, the host communication system accesses each of the password and stored results for a client communication system seeking access, retrieves the client-communication-system-specific identifier from the client communication system seeking access, performs a computation on the accessed password and the retrieval identifier, and compares the results to the accessed results.

Figure 1:
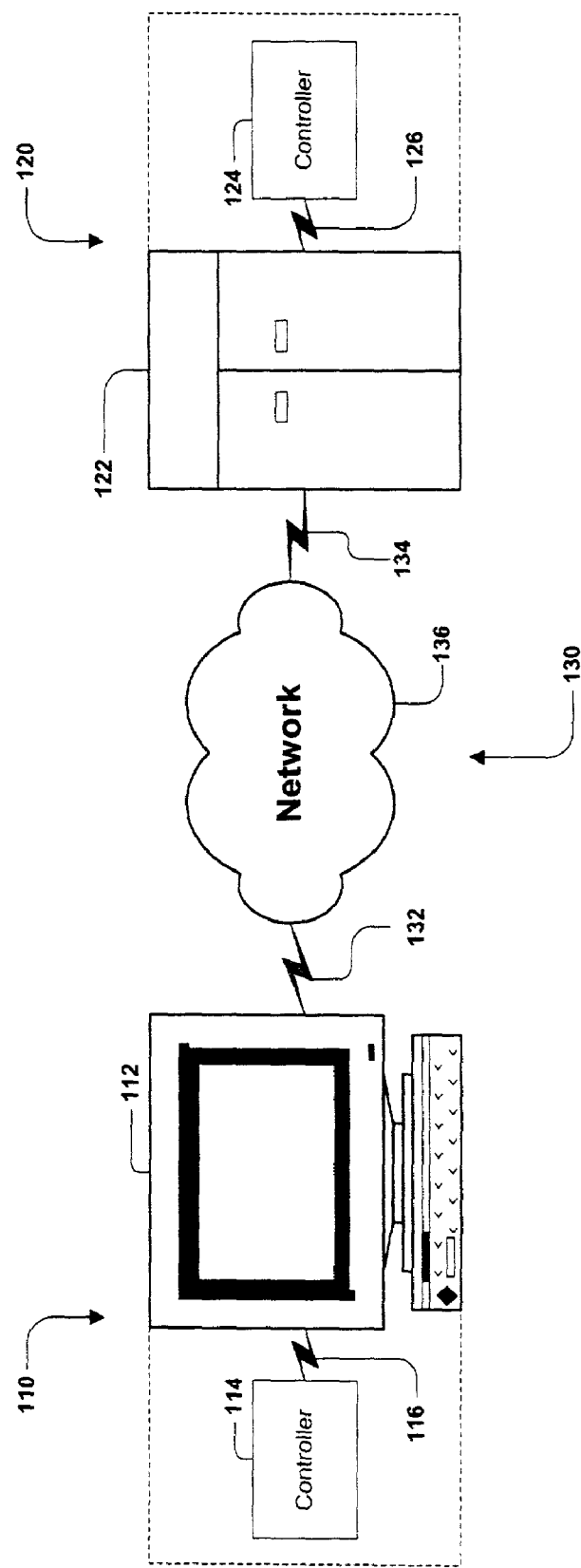
FIG. 1 is a block diagram illustrating an exemplary communication system capable of identifying unauthorized communication systems.
Figure 2:
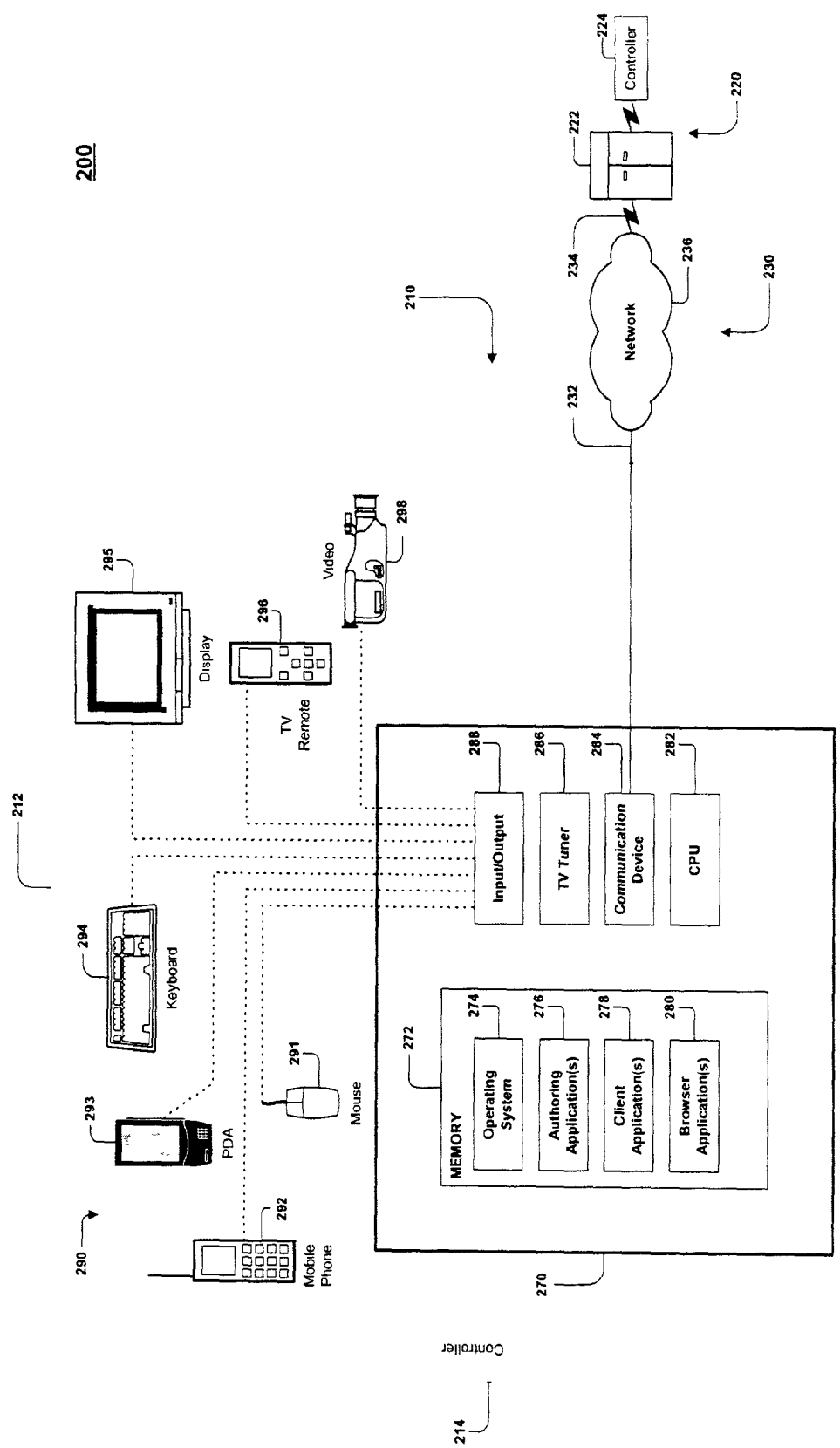
FIGS. 2 and 3 are diagrams illustrating aspects of the communication system of FIG. 1.
Figure 3:
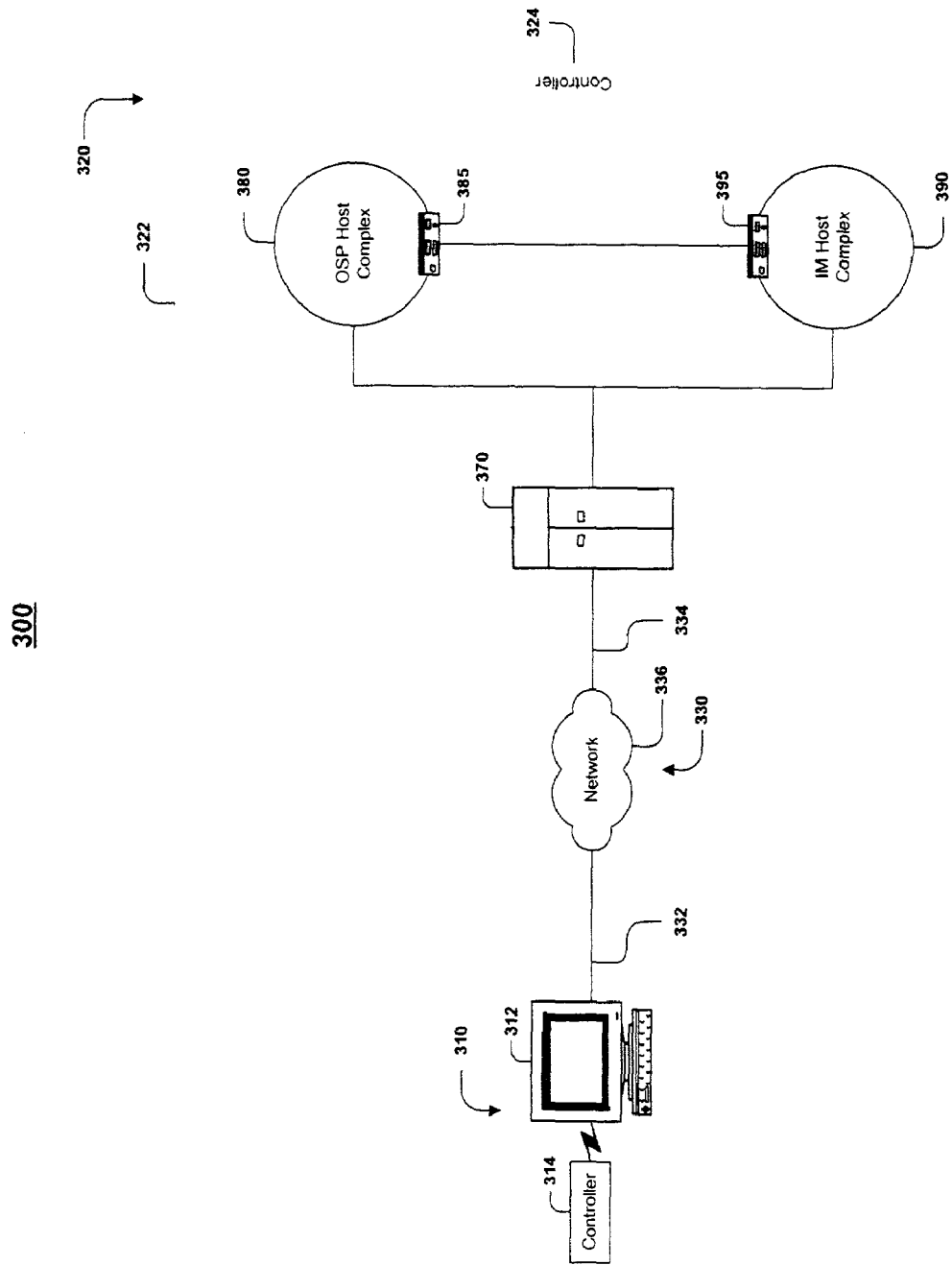

For illustrative purposes, FIGS. 1-3 describe a communications system for implementing techniques for transferring files between subscribers of an instant messaging host complex. For brevity, several elements in the figures are represented as monolithic entities. However, as would be understood by one skilled in the art, these elements each may include numerous interconnected computers and components designed to perform a set of specified operations and/or dedicated to a particular geographical region.

Referring to FIG. 1, a communications system 100 is capable of delivering and exchanging data between a client communication system 110 and a host communication system 120 through a communications link 130. The client communication system 110 typically includes one or more client devices 112 and/or client controllers 114, and the host communication system 120 typically includes one or more host devices 122 and/or host controllers 124. For example, the client communication system 110 or the host communication system 120 may include one or more general-purpose computers (e.g., personal computers), one or more special-purpose computers (e.g., devices specifically programmed to communicate with each other and/or the client communication system 110 or the host communication system 120), or a combination of one or more general-purpose computers and one or more special-purpose computers. The client communication system 110 and the host communication system 120 may be arranged to operate within or in concert with one or more other systems, such as, for example, one or more LANs ("Local Area Networks") and/or one or more WANs ("Wide Area Networks").

The client device 112 (or the host controller 122) is generally capable of executing instructions under the command of a client controller 114 (or a host controller 124). The client device 112 (or the host device 122) is connected to the client controller 114 (or the host controller 124) by a wired or wireless data pathway 116 or 126 capable of delivering data.

The client device 112, the client controller 114, the host device 122, and the host controller 124 each typically include one or more hardware components and/or software components. An example of a client device 112 or a host device 122 is a general-purpose computer (e.g., a personal computer) capable of responding to and executing instructions in a defined manner. Other examples include a special-purpose computer, a workstation, a server, a device, a component, other physical or virtual equipment, or some combination thereof capable of responding to and executing instructions.

An example of the client controller 114 or the host controller 124 is a software application loaded on the client device 112 or the host device 122 for commanding and directing communications enabled by the client device 112 or the host device 122. Other examples include a program, a piece of code, an instruction, a device, a computer, a computer system, or a combination thereof, for independently or collectively instructing the client device 112 or the host device 122 to interact and operate as described. The client controller 114 and the host controller 124 may be embodied permanently or temporarily in any type of machine, component, physical or virtual equipment, storage medium, or propagated signal capable of providing instructions to the client device 112 or the host device 122.

The communications link 130 typically includes a delivery network 136 making a direct or indirect communication path between the client communication system 110 and the host communication system 120, irrespective of physical separation. Examples of a delivery network 136 include the Internet, the World Wide Web, WANs, LANs, analog or digital wired and wireless telephone networks (e.g., PSTN, ISDN, and xDSL), radio, television, cable, satellite, and/or any other delivery mechanism for carrying data. The communications link 130 may include communication pathways 132, 134 that enable communications through the one or more delivery networks 136 described above. Each of the communication pathways 132, 134 may include, for example, a wired, wireless, cable or satellite communication pathway.

FIG. 2 illustrates a communication system 200 including a client communication system 210 that communicates with a host communication system 220 through a communications link 230. Client communication system 210 typically includes one or more client devices 212 and one or more client controllers 214 for controlling the client devices 212. Host communication system 220 typically includes one or more host devices 222 and one or more host controllers 224 for controlling the host devices 222. The communications link 230 may include communication pathways 232, 234 that enable communications through the one or more delivery networks 236.

Examples of each element within the communication system of FIG. 2 are broadly described above with respect to FIG. 1. In particular, the host communication system 220 and the communications link 230 typically have attributes comparable to those described with respect to the host communication system 120 and the communications link 130 of FIG. 1, respectively. Likewise, the client communication system 210 of FIG. 2 typically has attributes comparable to and may illustrate one possible implementation of the client communication system 110 of FIG. 1.

The client device 212 typically includes a general purpose computer 270 that has an internal or external storage 272 for storing data and programs such as an operating system 274 (e.g., DOS, Windows®, Windows® 95, Windows® 98, Windows®2000, Windows® NT, Windows® Millennium Edition, Windows® XP, OS/2, and Linux) and one or more application programs. Examples of application programs include authoring applications 276 (e.g., word processing, database programs, spreadsheet programs, presentation programs, and graphics programs) capable of generating documents or other electronic content; client applications 278 (e.g., AOL client, CompuServe client, AIM client, AOL TV client, and ISP client) capable of communicating with other computer users, accessing various computer resources, and viewing, creating, or otherwise manipulating electronic content; and browser applications 280 (e.g., Netscape's Navigator and Microsoft's Internet Explorer) capable of rendering standard Internet content.

The general-purpose computer 270 also includes a central processing unit 282 (CPU) for executing instructions in response to commands from the client controller 214. In one implementation, the client controller 214 includes one or more of the application programs installed on the internal or external storage 272 of the general-purpose computer 270. In another implementation, the client controller 214 includes application programs externally stored in and executed by one or more device(s) external to the general-purpose computer 270.

The general-purpose computer typically includes a communication device 284 for sending and receiving data. One example of the communication device 284 is a modem. Other examples include a transceiver, a set-top box, a communication card, a satellite dish, an antenna, or another network adapter capable of transmitting and receiving data over the communications link 230 through a wired or wireless data pathway 232. The general-purpose computer 270 also may include a TV ("television") tuner 286 for receiving television programming in the form of broadcast, satellite, and/or cable TV signals. As a result, the client device 212 can selectively and/or simultaneously display network content received by communications device 284 and television programming content received by the TV tuner 286.

The general-purpose computer 270 typically includes an input/output interface 288 that enables a wired or wireless connection to various peripheral devices 290. Examples of peripheral devices 290 include, but are not limited to, a mouse 291, a mobile phone 292, a personal digital assistant 293 (PDA), a keyboard 294, a display monitor 295 with or without a touch screen input, and/or a TV remote control 296 for receiving information from and rendering information to subscribers. Other examples may include voice recognition and synthesis devices.

Although FIG. 2 illustrates devices such as a mobile telephone 292, a PDA 293, and a TV remote control 296 as being peripheral with respect to the general-purpose computer 270, in another implementation, such devices may themselves include the functionality of the general-purpose computer 270 and operate as the client device 212. For example, the mobile phone 292 or the PDA 293 may include computing and networking capabilities, and may function as a client device 212 by accessing the delivery network 236 and communicating with the host communication system 220. Furthermore, the client communication system 210 may include one, some or all of the components and devices described above.

Referring to FIG. 3, a communications system 300 is capable of delivering and exchanging information between a client communication system 310 and a host communication system 320 through a communication link 330. Client communication system 310 typically includes one or more client devices 312 and one or more client controllers 314 for controlling the client devices 312. Host communication system 320 typically includes one or more host devices 322 and one or more host controllers 324 for controlling the host devices 322. The communications link 330 may include communication pathways 332, 334 that enable communications through the one or more delivery networks 336.

Examples of each element within the communication system of FIG. 3 are broadly described above with respect to FIGS. 1 and 2. In particular, the client communication system 310 and the communications link 330 typically have attributes comparable to those described with respect to client systems 110 and 210 and communications links 130 and 230 of FIGS. 1 and 2. Likewise, the host communication system 320 of FIG. 3 may have attributes comparable to and may illustrate one possible implementation of the host systems 120 and 220 shown in FIGS. 1 and 2.

The host communication system 320 includes a host device 322 and a host controller 324. In general, the host controller 324 is capable of transmitting instructions to any or all of the elements of the host device 322. For example, in one implementation, the host controller 324 includes one or more software applications loaded on the host device 322. However, in other implementations, as described above, the host controller 324 may include any of several other programs, machines, and devices operating independently or collectively to control the host device 322.

The host device 322 includes a login server 370 for enabling access by subscribers and routing communications between the client communication system 310 and other elements of the host device 322. The host device 322 also includes various host complexes, such as the depicted OSP ("Online Service Provider") host complex 380 and IM ("Instant Messaging") host complex 390. To enable access to these host complexes by subscribers, the client communication system 310 may include communication software, such as an OSP client application and an IM client application. The OSP and IM communication software applications are designed to facilitate interaction by the subscriber with the respective services and, in particular, may provide access to all the services available within the respective host complexes. For example, a subscriber may use the IM client application to view whether particular subscribers ("buddies") are online, exchange instant messages with particular subscribers, participate in group chat rooms, trade files such as pictures, invitations or documents, find other subscribers with similar interests, get customized news and stock quotes, and search the Web.

Typically, the OSP host complex 380 supports different services, such as email, discussion groups, chat, news services, and Internet access. The OSP host complex 380 is generally designed with an architecture that enables the machines within the OSP host complex 380 to communicate with each other using certain protocols (e.g., standards, formats, conventions, rules, and structures) to enable the transfer of data. The OSP host complex 380 ordinarily employs one or more OSP protocols and custom dialing engines to enable access by selected client applications. The OSP host complex 380 may define one or more specific protocols for each service based on a common, underlying proprietary protocol.

In general, the IM host complex 390 is independent of the OSP host complex 380, and supports instant messaging services regardless of a subscriber's network or Internet access. Thus, the IM host complex 390 allows subscribers to send and receive instant messages, whether or not they have access to any particular ISP. The IM host complex 390 may support associated services, such as administrative matters, advertising, directory services, chat, and interest groups related to the instant messaging. The IM host complex 390 has an architecture that enables all of the machines within the IM host complex to communicate with each other. To transfer data, the IM host complex 390 employs one or more standard or exclusive IM protocols.

The host device 322 may include one or more gateways that connect and therefore link complexes, such as the OSP host complex gateway 385 and the IM host complex gateway 395. The OSP host complex gateway 385 and the IM host complex gateway 395 may directly or indirectly link the OSP host complex 380 with the IM host complex 390 through a wired or wireless pathway. Ordinarily, when used to facilitate a link between complexes, the OSP host complex gateway 385 and the IM host complex gateway 395 are privy to information regarding a protocol anticipated by a destination complex, which enables any necessary protocol conversion to be performed incident to the transfer of data from one complex to another. For instance, the OSP host complex 380 and IM host complex 390 may use different protocols such that transferring data between the complexes requires protocol conversion by or at the request of the OSP host complex gateway 385 and/or the IM host complex gateway 395.

Figure 4:
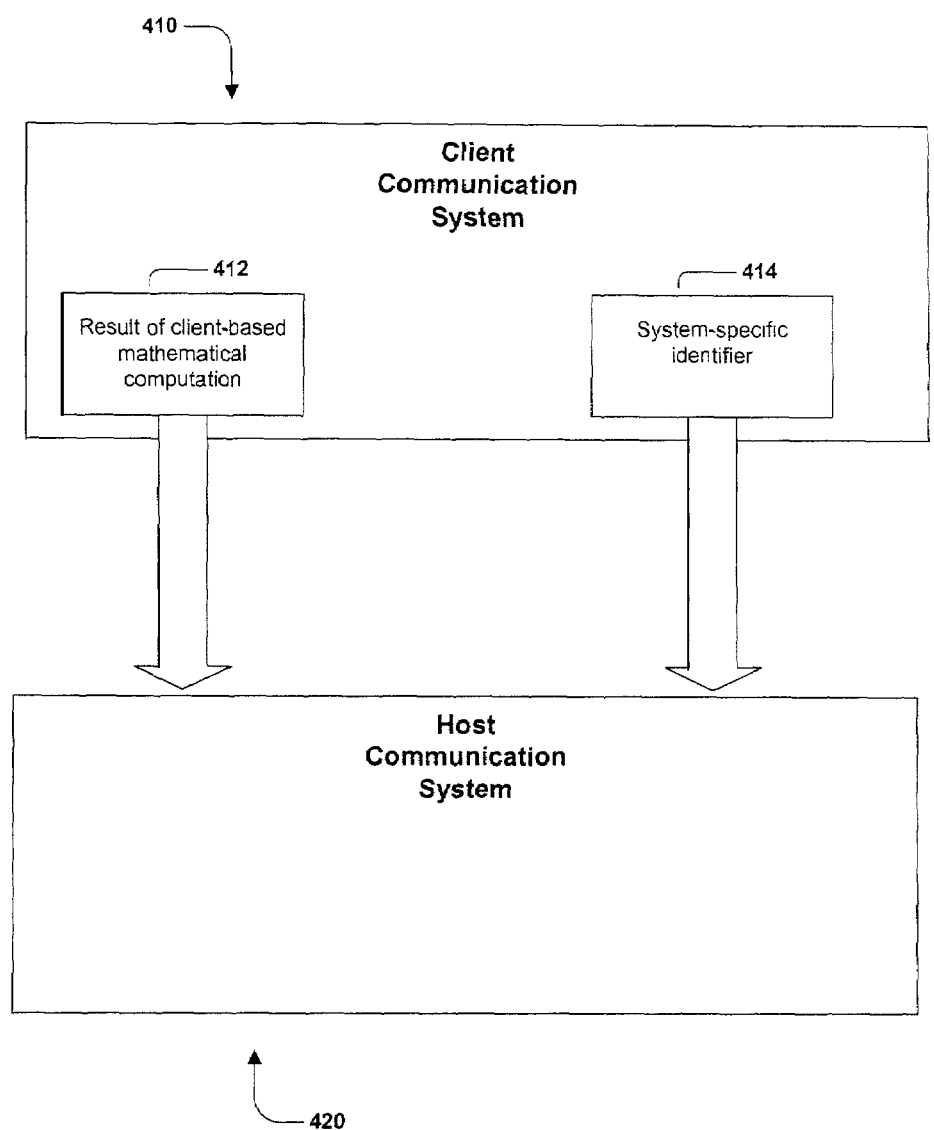
FIG. 4 is a block diagram illustrating communication between the client communication system and the host communication system to authenticate the client communication system.

FIG. 4 illustrates an information flow between the client communication system 410 and the host communication system 420 in a typical exchange during which the host communication system 420 authenticates the client communication system 410; that is, designates the client communication system 410 as an authorized system. In general, the client communication system 410 corresponds to elements 110, 210, and 310 of FIGS. 1-3, and the host communication system 420 with which the client communication system 410 communicates corresponds to elements 120, 220, and 320 of FIGS. 1-3. However, either may be incorporated into other types of communication systems.

The client communication system 410 sends the result 412 of a first mathematical computation and a system-specific identifier 414 to the host communication system. The client communication system 410 or the host communication system 420 may initiate this information transfer. As will be described later, the host communication system 420 uses the result 412 of the first mathematical computation and the system-specific identifier 414 to determine whether the client communication system 410 is an authorized system.

Figure 5:
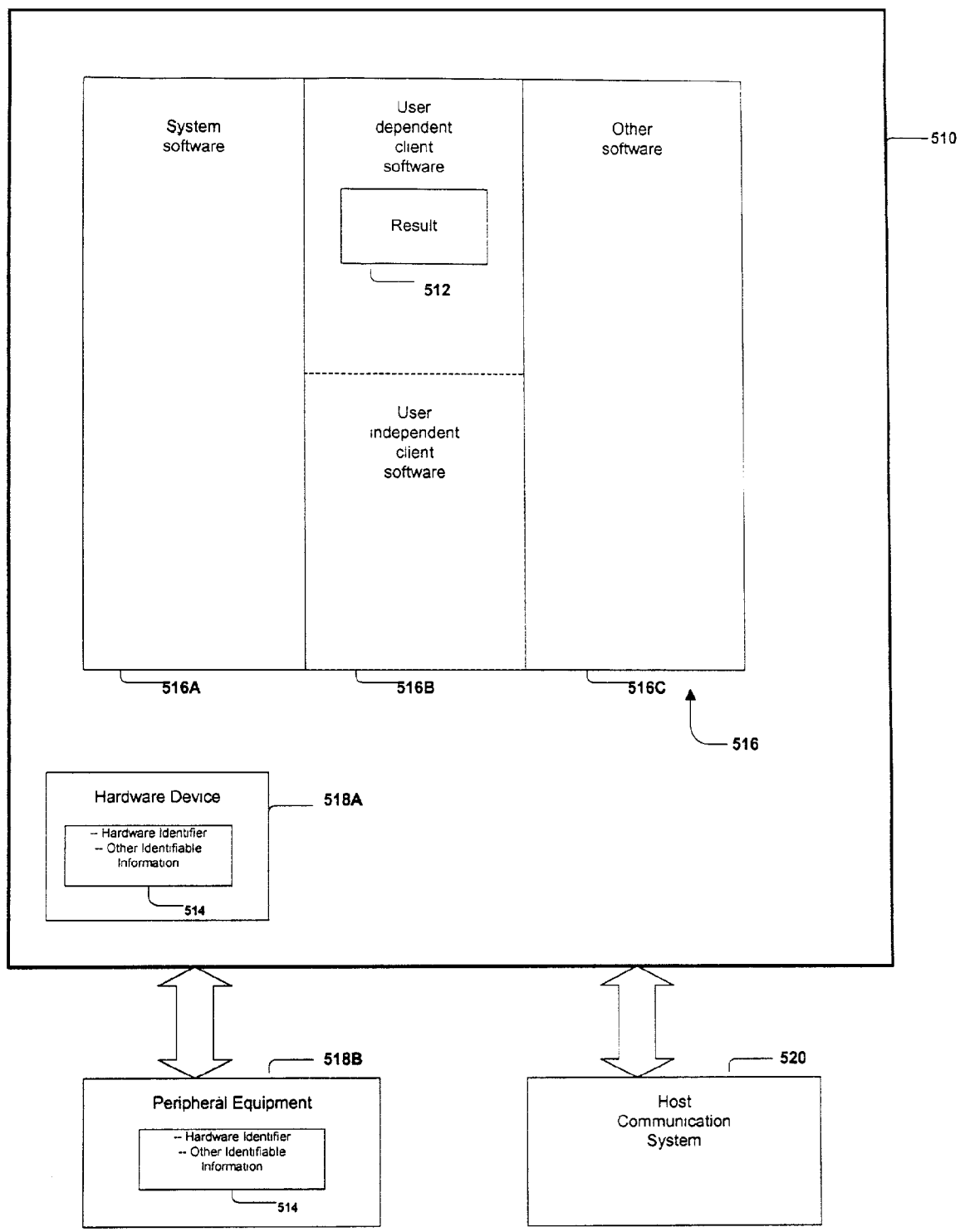
FIG. 5 is a block diagram illustrating a logical configuration of software elements within the client communication system of FIG. 1.

FIG. 5 illustrates aspects of a client communication system 510 that is authorized to communicate with a host communication system 520. In general, the client communication system 510 corresponds to elements 110, 210, 310 and 410 of FIGS. 1-4, and the host communication system 520 with which the client communication system communicates corresponds to elements 120, 220, 320, and 420 of FIGS. 1-4. However, either may be incorporated into other types of communication systems.

The client communication system 510 generally includes memory or storage 516, one or more hardware devices 518A, and one or more external and/or peripheral hardware devices 518B.

As shown, the memory 516 of the client communication system 510 contains system software 516A, client software 516B, and other software 516C. In general, the system software 516A includes programs and data enabling operation of the client communication system 510, and the other software 516C includes other programs and data enabling the execution of applications and the storage and retrieval of data using the client communication system 510. While active, the system software 516A and the other software 516C generally are stored in the memory of a client communications system 510. However, while dormant, various aspects of the software may be located in other storage at the client communication system 510.

In general, the client software 516B includes programs and data files capable of enabling communication between the client communication system 510 and the host communication system 520. As shown, the client software 516B may be stored on the client communication system 510 and loaded into the memory of a client controller, such as that shown and described with respect to items 114, 214, and 314 of FIGS. 1-3, when communications are to be initiated with the host communication system 520.

The client software 516B generally includes several modules for performing various functions. Modules of the client software 516B may include user-independent software, user-dependent software and combinations thereof. User-independent software generally includes static information within the client software, such as fixed instructions and read only modules. By contrast, user-dependent software may include data reflecting user system attributes, such as modem type and speed, and processor characteristics. The user-dependent software also may include data related to particular users, such as demographic data, personalizable configuration data, and user-specific login data, such as, for example, the result of a mathematical computation performed on an access password and a client-communication-system-specific identifier, such as that described below with respect to FIG. 6.

Although the software 516A-516C shown by FIG. 5 appears to have a sequential orientation, left-to-right, the contents of memory 516 may be oriented in any manner designated by the client communication system. Furthermore, although shown as being positioned at a single portion of the memory, at least the client software 516B may be disbursed among several portions of memory, within one or more physical devices.

Figure 6:
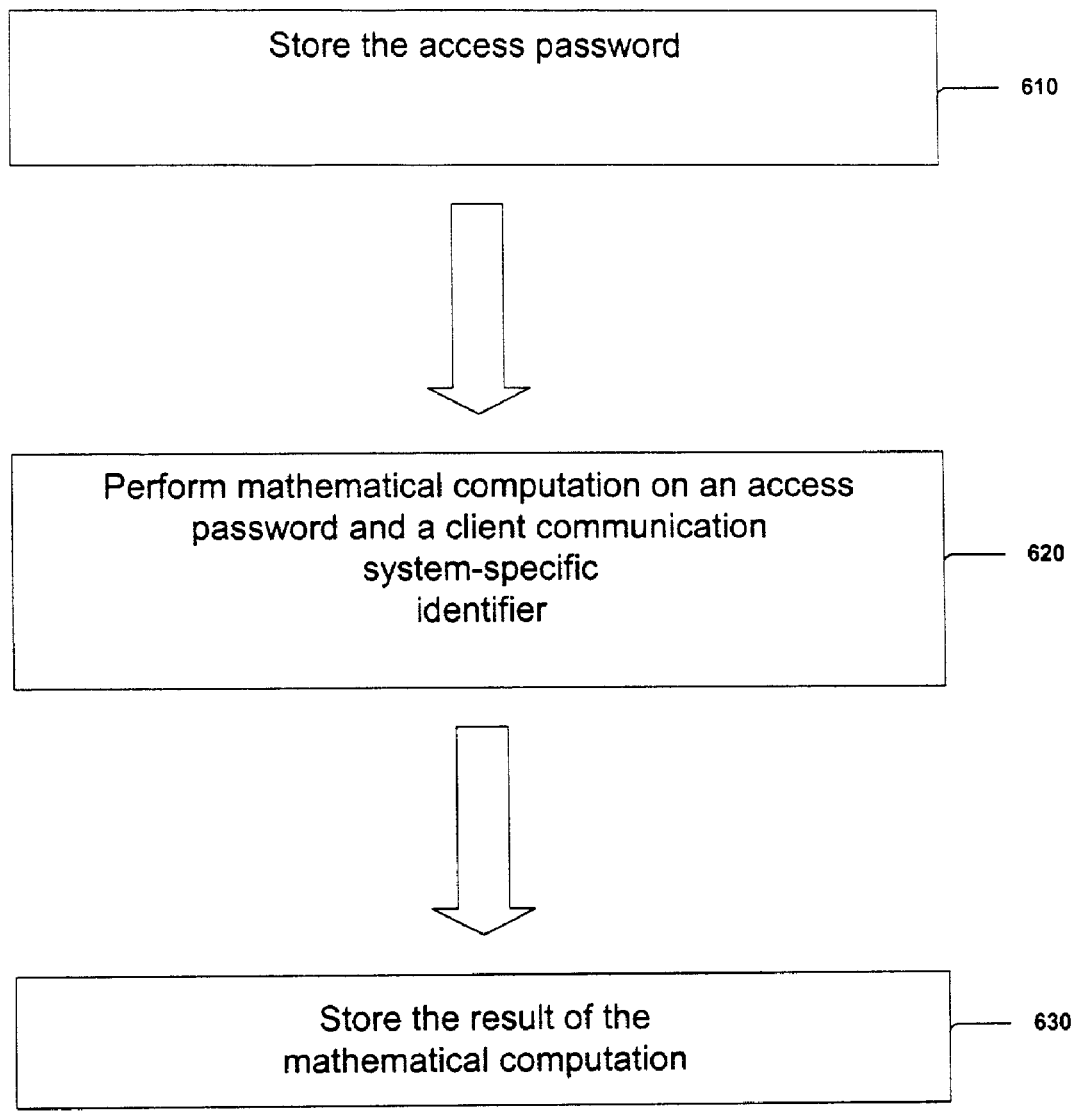
FIG. 6 is a flow chart of the process performed to store information about an authorized client communication system.

As illustrated by FIG. 6, an aspect of the overall implementation may involve storing information such as an access password and a result of a mathematical computation involving either or both of a password and a system-specific identifier. Initially, an access password is stored at the host communication system (step 610). Generally, a user of a client communication system enters an access password to register as a new user of a host communication system, to change an existing password, or to access the host communication system. When the client communication system is being registered as an authorized system or an existing password is being changed, the host communication system stores the access password to later authenticate the client communication system.

The access password may include a password that ordinarily is provided by a user of the client communication system seeking access to the host communication system. Typically, users of client communication systems are identified to a host communication system by a user name and a password, with the password being kept secret to prevent unauthorized users from accessing the host communication system under the guise of an authorized user. In an implementation in which a mobile phone is operating as a client communication system, a user may enter a personal identification number (PIN) as an access password. The access password may include various types of passwords, such as, for example, a subscriber password, an account password and a personal identification number (PIN).

Next, a mathematical computation is performed on the access password and a client communication system-specific identifier (step 620). The mathematical computation may include, for example, a hashing algorithm, a secure hashing algorithm or another algorithm, and may be performed at the host communication system, the client communication system, or some intermediary or third party system.

The client communication system-specific identifier may be a device-specific identifier, such as a hard disk identifier (e.g., a unique hard drive serial number), an Ethernet address, a CPU serial number, or a storage characteristic of a hard disk. Such storage characteristics may include, for example, the size (e.g., amount of storage capacity) and geometry of the hard drive (e.g., number of partitions, sectors, and cylinders).

Finally, the result of the mathematical computation is stored on the client communication system for later use in authenticating the client communication system.

The processes described with respect to FIG. 6 may be performed by a software module on the host communication system, such as those described above with respect to items 120, 220, 320, and 420 of FIGS. 1-4, or one or more of those processes may be performed by a software module on the client communication system, such as those described with respect to items 110, 210, 310 and 410 of FIGS. 1-4. For instance, software modules on the client or host communication systems may perform a mathematical computation on the access password and a client communication system-specific identifier (step 620) and/or store the result of the mathematical computation (step 630).

Figure 7:
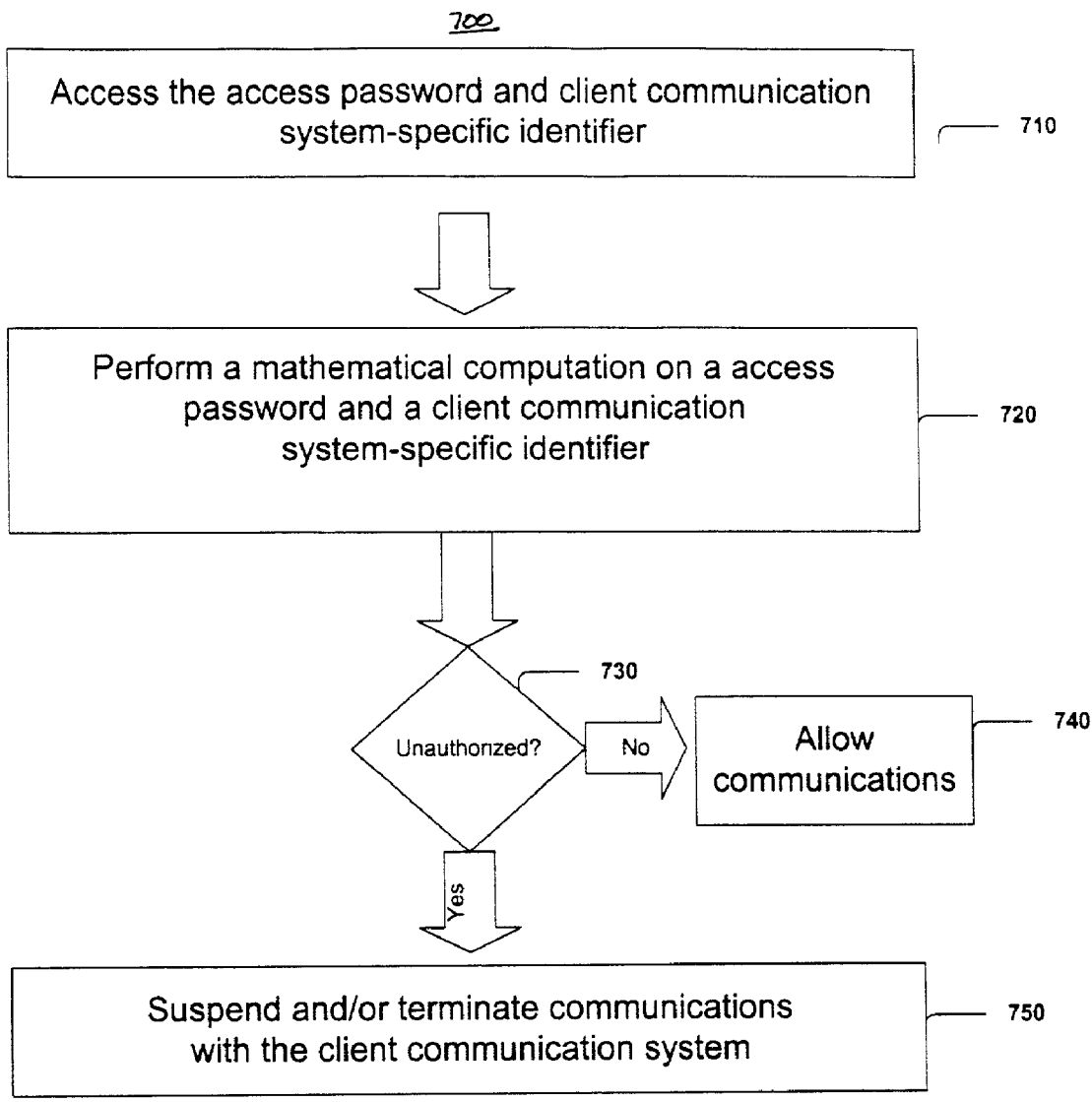
FIGS. 7 and 8 are flow charts of processes performed to authenticate the client communication system.

FIG. 7 illustrates an exemplary method 700 performed to determine whether a client communication system seeking access to a host communication system is authorized to do so. In general, the processes described with respect to FIG. 7 are performed by a software module on the host communication system, such as those described above with respect to items 120, 220, 320, and 420 of FIGS. 1-4.

In method 700, the host communication system accesses the access password and the client-communication-system-specific identifier (step 710). The host communication system then performs a mathematical computation on the access password and the client communication-system-specific identifier (step 720) and designates the client communication system as being authorized or unauthorized (step 730). If the client communication system is authorized, the host communication system allows communications (step 740). If the client communication system is not authorized, communications with the client communication system may be suspended or terminated (step 750).

Figure 8:
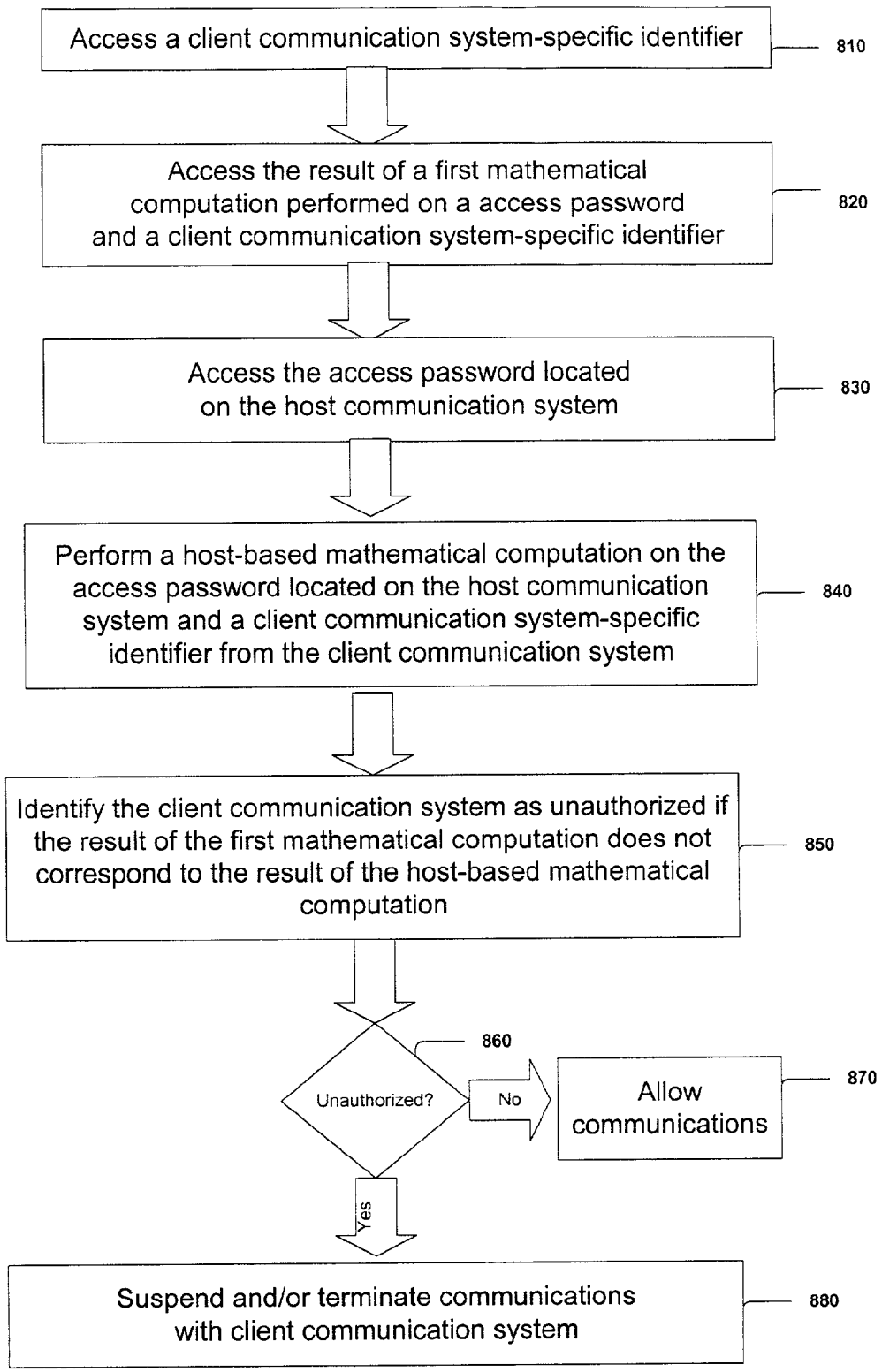

FIG. 8 illustrates a process 800 that is a more specific example of a process for determining whether a client communication system is authorized based on a mathematical computation using a client-communication-system-specific identifier. In general, the process 800 is performed by a software module on the host communication system described above with respect to items 120, 220, 320, and 420 of FIGS. 1-4.

In the typical implementation of FIG. 8, the host communication system accesses a client-communication-system-specific identifier from the client communication system seeking access (step 810). The client-communication-system-specific identifier typically is received by the host communication system when communication from the client communication system is initiated.

The type of client-communication-system-specific identifier accessed by the mathematical computation may vary based on the type of client communication system seeking access. For example, an Ethernet address may be used for a client communication system using a version of the Microsoft® operating system and having an Ethernet communication card, while a client communication system using a version of the Microsoft® Windows® operating system which does not have an Ethernet communications card may use a different system-specific identifier, such as, for example, a hard disk identifier. A hard disk identifier may be used for a client communication system using a version of the Microsoft® Windows® operating system, while an APPLE iMac client communication system may use a different system-specific identifier, such as, for example, the system's Ethernet address.

The host communication system also accesses 820 the result of a first mathematical computation that has been performed on an access password and a client communication system-specific identifier and stored on the client communication system (as discussed above with respect to FIG. 6) (step 820).

The host communication system also accesses an access password for the client communication system located on the host communication system (step 830). Various implementations may access a subscriber password, a system password, a user password, or another type of password. The type of access password stored on the host communication system corresponds to the type of access password used by the client communication system seeking access.

The host communication system performs a host-based mathematical computation on the access password located on the host communication system and the client communication system-specific identifier accessed from the client communication system (step 840). The mathematical computation may be any algorithm, such as a hashing algorithm or a secure hashing algorithm.

The host communication system designates the client communication system as unauthorized (step 850) if the result of the first mathematical computation does not correspond to the result of the host-based mathematical computation. Thus, in this implementation, the processes used in the first mathematical computation and the host-based mathematical computation are the same. Similarly, the client communication system-specific identifier used in the first mathematical computation and the host-based mathematical computation are the same.

If the result of the first mathematical computation that has been accessed by the host communication system corresponds to the result of the host-based mathematical computation performed on the client communication system-specific identifier from the client communication system and the access password for the client communication system located on the host communication system (step 860), then the client communication system is authorized and the host communication system allows communications from the client communication system (step 870).

Any of several actions may be taken in response to a failure to authenticate (step 880), including one or more of terminating the communication session immediately, terminating the communication session after a delay, requesting additional authenticating information from the client communication system, displaying an error message, and blocking further communication from the Internet protocol (IP) address of the accessing system. Other responses also may be appropriate.

Other aspects of the above implementations involve varying the algorithm and the client-communication-system-specific identifier used in the mathematical computation to make it difficult for third parties to determine how this authentication is performed, and thus difficult to defeat. As described previously, the mathematical computation performed to authenticate the client communication system must be the same mathematical computation used on the stored result that is used for comparison. For example, the mathematical computation may be varied periodically as long as the result of the new mathematical computation is stored for authentication of the client communication system.

Implementations may include a method or process, an apparatus or system, or computer software on a computer medium. Further implementations are within the scope of the following claims.

What is claimed is:

1. A method for determining whether a client communication system seeking access to a host communication system is authorized to do so, the method comprising:
    receiving, at the host, from the client communication system, a user-independent client-communication-system-specific identifier and results of a first mathematical computation performed at the client on a first user-dependent access identifier and the user-independent client-communication-system-specific identifier;
    accessing, at the host and based on the receipt of the user-independent client communication-system-specific identifier, a second user dependent access identifier;
    performing a second mathematical computation using the accessed second user-dependent access identifier and the user-independent client-communication-system-specific identifier received from the client communication system;
    comparing results of the first and second mathematical computations; and
    designating a client communication system as unauthorized based on the comparison of the results of the first and second mathematical computations,
    wherein the user-independent client-communication-system-specific identifier is derived from information that identifies at least a hardware component or aspect of the client communication system.

2. The method of claim 1, wherein either the first or second mathematical computations comprises a hashing algorithm.

3. The method of claim 1, wherein the first mathematical computation is performed when a communication is initiated.

4. The method of claim 1, wherein the first and second user-dependent access identifiers comprise a subscriber password.

5. The method of claim 1, wherein the first and second user-dependent access identifiers comprise a user password.

6. The method of claim 1, wherein the first and second user-dependent access identifiers comprise an account password.

7. The method of claim 1, wherein the user-independent client-communication-system-specific identifier comprises a device-specific identifier.

8. The method of claim 7, wherein the device-specific identifier comprises a hard disk identifier.

9. The method of claim 7, wherein the device-specific identifier comprises an Ethernet address.

10. The method of claim 7, wherein the device-specific identifier comprises a central processing unit serial number.

11. The method of claim 7, wherein the device-specific identifier comprises a description of the storage characteristics of the hard disk.

12. The method of claim 1, further comprising sending a notification to the client communication system indicating the designation of the client communication system as an unauthorized client communication system if the result of the first mathematical computation does not correspond to the result of the second mathematical computation.

13. The method of claim 1, further comprising terminating communications from the client communication system if the result of the first mathematical computation does not correspond to result of the second mathematical computation.

14. The method of claim 13, wherein terminating communications is performed after a predetermined delay if the result of the first mathematical computation does not correspond to the result of the second mathematical computation.

15. A method for handling information about an authorized client communication system, the method comprising:
    storing a version of a user-dependent access identifier;
    storing a user-independent client-communication-system-specific identifier and results of a first mathematical computation performed, at a client communication system, on the user-dependent access identifier and the user-independent client-communication-system-specific identifier;
    performing a second mathematical computation on the stored version of the user-dependent access identifier and the retrieved user-independent client-communication-system-specific identifier, and
    storing the results of the second mathematical computation,
    wherein the user-independent client-communication-system-specific identifier is derived from information that identifies at least a hardware component or aspect of the client communication system.

16. The method of claim 15, wherein:
    storing the result of the first mathematical computation comprises storing the result on the client communication system,
    storing the version of the user-dependent access identifier comprises storing the version of the user-dependent access identifier on the host communication system.

17. The method of claim 15, wherein either the first or second mathematical computations comprises a hashing algorithm.

18. The method of claim 15, wherein the user-dependent access identifier and the stored version of the user-dependent access identifier comprises a subscriber password.

19. The method of claim 15, wherein the user-dependent access identifier and the stored version of the user-dependent access identifier comprises a user password.

20. The method of claim 15, wherein the user-dependent access identifier and the stored version of the user-dependent access identifier comprises an account password.

21. The method of claim 15, wherein the user-independent client-communication-system-specific identifier comprises a device-specific identifier.

22. The method of claim 21, wherein the device-specific identifier comprises a hard disk identifier.

23. The method of claim 21, wherein the device-specific identifier comprises an Ethernet address.

24. The method of claim 21, wherein the device-specific identifier comprises a central processing unit serial number.

25. The method of claim 21, wherein the device-specific identifier comprises a description of the storage characteristics of the hard disk.

26. A computer readable medium or propagated signal having embodied thereon a computer program for identifying an unauthorized client communication system seeking access to a host communication system, the computer program comprising:
   a performing code segment for performing a first mathematical computation on a first user-dependent access identifier and a user-independent client-communication-system-specific identifier;
   a receiving code segment for receiving, at the host, from the client communication system, a user-independent client-communication-system-specific identifier and results of a first mathematical computation performed at the client on the first user-dependent access identifier and the user-independent client-communication-system-specific identifier;
   a receiving code segment for retrieving, at the host, a second user-dependent access identifier;
   a performing code segment for performing a second mathematical computation using the received second user-dependent access identifier and the user-independent client-communication-system-specific identifier received from the client communication system;
   comparing results of the first and second mathematical computations; and
   a designating code segment for designating a client communication system as unauthorized based on a results of the first and second mathematical computations,
   wherein the user-independent client-communication-system-specific identifier is derived from information that identifies at least a hardware component or aspect of the client communication system.

27. The medium of claim 26, wherein either the first or second mathematical computations comprises a hashing algorithm.

28. The medium of claim 26, wherein the performing code segment performs the first mathematical computation when a communication is initiated.

29. The medium of claim 26, wherein the first and second user-dependent access identifiers comprise a subscriber password.

30. The medium of claim 26, wherein the first and second user-dependent access identifiers comprise a user password.

31. The medium of claim 26, wherein the first and second user-dependent access identifiers comprise an account password.

32. The medium of claim 26, wherein the user-independent client-communication-system-specific identifier comprises a device-specific identifier.

33. The medium of claim 32, wherein the device-specific identifier comprises a hard disk identifier.

34. The medium of claim 32, wherein the device-specific identifier comprises an Ethernet address.

35. The medium of claim 32, wherein the device-specific identifier comprises a central processing unit serial number.

36. The medium of claim 32, wherein the device-specific identifier comprises a description of the storage characteristics of the hard disk.

37. The medium of claim 26, further comprising a notification code segment for sending a notification to the client communication system indicating the designation of the client communication system as an unauthorized client communication system if the result of the first mathematical computation does not correspond to the result of the second mathematical computation.

38. The medium of claim 26, further comprising a terminating code segment for terminating communications from the client communication system if the result of the first mathematical computation does not correspond to result of the second mathematical computation.

39. The medium of claim 38, wherein the terminating code segment terminates communications after a predetermined delay if the result of the first mathematical computation does not correspond to the result of the host-based mathematical computation.

40. A computer readable medium or propagated signal having embodied thereon a computer program for handling information about an authorized client communication system, the computer program comprising:
   a user-dependent access identifier storing code segment for storing a version of a user-dependent access identifier;
   a storing code segment for storing, at the host, a user-independent client-communication-system-specific identifier and results of a first mathematical computation performed on the user-dependent access identifier and the user-independent client-communication-system-specific identifier;
   a performing code segment for performing a second mathematical computation on the stored version of the user-dependent access identifier and the retrieved user-independent client-communication-system-specific identifier; and
   a computation storing code segment for storing the results of the second mathematical computations,
   wherein the user-independent client-communication-system-specific identifier is derived from information that identifies at least a hardware component or aspect of the client communication system.

41. The medium of claim 40, wherein the performing code segment includes:
   a computation storing code segment for storing the result of the first mathematical computation comprises storing the result on the client communication system,
   a user-dependent access identifier storing code segment to store the version of the user-dependent access identifier comprises a code segment for storing the result on the host communication system.

42. The medium of claim 40, wherein either the first or second mathematical computations comprises a hashing algorithm.

43. The medium of claim 40, wherein the user-dependent access identifier and the stored version of the user-dependent access identifier comprises a subscriber password.

44. The medium of claim 40, wherein the user-dependent access identifier and the stored version of the user-dependent access identifier comprises a user password.

45. The medium of claim 40, wherein the user-dependent access identifier and the stored version of the user-dependent access identifier comprises an account password.

46. The medium of claim 40, wherein the user-independent client-communication system-specific identifier comprises a device-specific identifier.

47. The medium of claim 46, wherein the device-specific identifier comprises a hard disk identifier.

48. The medium of claim 46, wherein the device-specific identifier comprises an Ethernet address.

49. The medium of claim 46, wherein the device-specific identifier comprises a central processing unit serial number.

50. The medium of claim 46, wherein the device-specific identifier comprises a description of the storage characteristics of the hard disk.

51. An apparatus for identifying an unauthorized client communication system seeking access to a host communication system, the apparatus comprising:
a performing device structured and arranged to perform, at a client, a first mathematical computation on a first user-dependent access identifier and a user-independent client-communication-system-specific identifier;
a receiving device structured and arranged to receive, at the host, from the client communication system, a user-independent client-communication-system-specific identifier and results of a first mathematical computation performed at the client on the first user-dependent access identifier and the user-independent client-communication-system-specific identifier;
an accessing device structured and arranged to access, at the host, a second user-dependent access identifier;
a performing device structured and arranged to perform a second mathematical computation using the accessed second user-dependent access identifier and the user-independent client-communication-system-specific identifier received from the client communication system;
a comparing device structured and arranged to compare results of the first and second mathematical computations; and
a designating device structured and arranged to designate a client communication system as unauthorized based on the results of the first and second mathematical computations,
wherein the user-independent client-communication-system-specific identifier is derived from information that identifies at least a hardware component or aspect of the client communication system.

52. The apparatus of claim 51, wherein either the first or second mathematical computations comprises a hashing algorithm.

53. The apparatus of claim 51, wherein the first mathematical computation is performed when a communication is initiated.

54. The apparatus of claim 51, wherein the first and second user-dependent access identifiers comprise a subscriber password.

55. The apparatus of claim 51, wherein the first and second user-dependent access identifiers comprise a user password.

56. The apparatus of claim 51, wherein the first and second user-dependent access identifiers comprise an account password.

57. The apparatus of claim 51, wherein the user-independent client-communication-system-specific identifier comprises a device-specific identifier.

58. The apparatus of claim 57, wherein the device-specific identifier comprises a hard disk identifier.

59. The apparatus of claim 57, wherein the device-specific identifier comprises an Ethernet address.

60. The apparatus of claim 57, wherein the device-specific identifier comprises a central processing unit serial number.

61. The apparatus of claim 57, wherein the device-specific identifier comprises a description of the storage characteristics of the hard disk.

62. The apparatus of claim 51, further comprising a device structured and arranged to terminate communications from the client communication system if the result of the first mathematical computation does not correspond to result of the second mathematical computation.

63. An apparatus for handling information about an authorized client communication system, the apparatus comprising:
a user-dependent access identifier device structured and arranged to store a version of a first user-dependent access identifier;
a receiving device structured and arranged to receive, at the host, from the client communication system, a user-independent client-communication-system-specific identifier and results of a first mathematical computation performed at the client on the first user-dependent access identifier and the user-independent client-communication-system-specific identifier;
an accessing device structured and arranged to access, at the host, a second user-dependent access identifier;
a performing device structured and arranged to perform a second mathematical computation using the accessed second user-dependent access identifier and the user-independent client-communication-system-specific identifier received from the client communication system;
a comparing device structured and arranged to compare results of the first and second mathematical computations; and
a designation device structured and arranged to designate a client communication system as unauthorized based on the comparison of the results of the first and second mathematical computations, and
wherein the user-independent client-communication-system-specific identifier is derived from information that identifies at least a hardware component or aspect of the client communication system.

64. The apparatus of claim 63, wherein the performing device includes:
a device for storing the result of the first mathematical computation comprises storing the result on the client communication system,
a user-dependent access identifier storing device for storing the version of the first user-dependent access identifier comprises storing the result on the host communication system.

65. The apparatus of claim 63, wherein either the first or second mathematical computations comprises a hashing algorithm.

66. The apparatus of claim 63, wherein the first and second user-dependent access identifiers comprise a subscriber password.

67. The apparatus of claim 63, wherein the first and second user-dependent access identifiers comprise a user password.

68. The apparatus of claim 63, wherein the first and second user-dependent access identifiers comprise an account password.

69. The apparatus of claim 63, wherein the user-independent client-communication-system-specific identifier comprises a device-specific identifier.

70. The apparatus of claim 69, wherein the device-specific identifier comprises a hard disk identifier.

71. The apparatus of claim 69, wherein the device-specific identifier comprises an Ethernet address.

72. The apparatus of claim 69, wherein the device-specific identifier comprises a central processing unit serial number.

73. The apparatus of claim 69, wherein the device-specific identifier comprises a description of the storage characteristics of the hard disk.

* * * * *